United States Patent
Wang et al.

(10) Patent No.: US 11,755,188 B2
(45) Date of Patent: Sep. 12, 2023

(54) PATTERNS ON AUTOMATED FRACTURING PUMP SETUP AND OPERATIONS

(71) Applicant: Schlumberger Technology Corporation, Sugar Land, TX (US)

(72) Inventors: Ying Wang, Houston, TX (US); Alexander Tanner Taylor, Missouri City, TX (US); Bao Mi, Houston, TX (US); Nan Mu, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 78 days.

(21) Appl. No.: 17/618,730

(22) PCT Filed: Jun. 17, 2020

(86) PCT No.: PCT/US2020/038054
§ 371 (c)(1),
(2) Date: Dec. 13, 2021

(87) PCT Pub. No.: WO2020/257228
PCT Pub. Date: Dec. 24, 2020

(65) Prior Publication Data
US 2022/0300148 A1  Sep. 22, 2022

Related U.S. Application Data

(60) Provisional application No. 62/862,887, filed on Jun. 18, 2019.

(51) Int. Cl.
*G06F 3/048* (2013.01)
*G06F 3/04847* (2022.01)
(Continued)

(52) U.S. Cl.
CPC ...... *G06F 3/04847* (2013.01); *E21B 43/2607* (2020.05); *G05D 7/0676* (2013.01); *G06F 3/0482* (2013.01)

(58) Field of Classification Search
None
See application file for complete search history.

(56) References Cited

U.S. PATENT DOCUMENTS

| 10,465,676 B2 * | 11/2019 | Robol | F04B 19/00 |
| 2012/0029661 A1 * | 2/2012 | Jones | G06F 3/0484 700/17 |

(Continued)

OTHER PUBLICATIONS

International Search Report and Written Opinion issued in International Patent application PCT/US2020/038054 dated Sep. 14, 2020, 11 pages.

(Continued)

*Primary Examiner* — Thanh T Vu

(57) ABSTRACT

Systems and methods presented herein include a computing system that includes a non-transitory memory and one or more hardware processors configured to read instructions from the non-transitory memory to perform operations. The operations include detecting one or more pumps of a wellsite system that are activated. The operations also include generating a graphical user interface. The graphical user interface includes a pump list panel comprising one or more pump icons, each pump icon corresponding to a pump of the one or more pumps. The graphical user interface also includes a manifold layout panel comprising a manifold outline that represents an actual physical layout of one or more manifolds of the wellsite system. The operations also include receiving, via the graphical user interface, an input assigning a pump icon of the one or more pump icons onto a pump location of the manifold outline. The operations further include updating the graphical user interface to (Continued)

display one or more operating parameters of the pump corresponding to the pump icon proximate the pump icon.

32 Claims, 12 Drawing Sheets

(51) Int. Cl.
  *E21B 43/26* (2006.01)
  *G05D 7/06* (2006.01)
  *G06F 3/0482* (2013.01)

(56) References Cited

U.S. PATENT DOCUMENTS

| | | | | |
|---|---|---|---|---|
| 2014/0096057 A1* | 4/2014 | Marston | ............... | B67D 7/04 715/771 |
| 2014/0352954 A1* | 12/2014 | Lakhtychkin | ......... | E21B 43/267 166/250.15 |
| 2015/0142319 A1* | 5/2015 | McCoy | ............... | G01L 5/0061 702/9 |
| 2015/0144336 A1* | 5/2015 | Hardin | ............... | E21B 43/2607 166/250.01 |
| 2016/0314225 A1* | 10/2016 | Gonzales | ............... | E21B 43/124 |
| 2016/0334781 A1* | 11/2016 | Blank | ............... | G05B 23/0216 |
| 2017/0167223 A1* | 6/2017 | James | ............... | E21B 33/14 |
| 2018/0202850 A1 | 7/2018 | Beisel | | |
| 2018/0363459 A1* | 12/2018 | Williams | ............... | E21B 47/005 |
| 2019/0102072 A1* | 4/2019 | Strinden | ............... | G06F 3/0483 |
| 2020/0109616 A1* | 4/2020 | Oehring | ............... | B01D 46/003 |
| 2020/0240248 A1* | 7/2020 | Abdeldaim | ............ | F04C 2/1071 |

OTHER PUBLICATIONS

International Preliminary Report on Patentability issued in International Patent application PCT/US2020/038054, dated Dec. 30, 2021, 8 pages.

* cited by examiner

PATTERNS ON AUTOMATED FRACTURING PUMP SETUP AND OPERATIONS

CROSS-REFERENCES TO RELATED APPLICATIONS

This application claims priority to and the benefit of U.S. Provisional Patent Application Ser. No. 62/862,887, entitled "Design Patterns on Automated Fracturing Pump Setup and Operations," filed Jun. 18, 2019, which is hereby incorporated by reference in its entirety for all purposes.

BACKGROUND

The present disclosure relates generally to systems and methods for providing information on a user interface and, more specifically, to systems and methods for providing information on a user interface to facilitate interaction with fracturing pumps of a wellsite system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

High-volume, high-pressure pumps are utilized at wellsites for a variety of pumping operations. Such operations may include drilling, cementing, acidizing, water jet cutting, hydraulic fracturing, and other wellsites operations. In some pumping operations, several pumps may be fluidly connected to a well via various fluid conduits and/or a manifold. During such operations, the fluid conduits and/or the manifold distributes low-pressure fluid from a mixer, a blender, and/or other sources among the pumps and combines pressurized fluid from the pumps for injection into the well.

Success of the pumping operations at wellsites may be affected by marry factors, including efficiency, failure rates, and safety related to operation of the pumps. Systematic high fluid pressures, flow rates, and vibrations generated by the pumps may cause mechanical fatigue, wear, and other damage to the pumps, which may decrease pumping flow rates and efficiency. To ensure that the pumps produce the intended flow rates or otherwise operate as intended, human operators at the wellsite may manually control or adjust operation of each pump and the associated transmission during downhole pumping operations and/or perform pressure and flow rate calibrations, diagnostics, and other tests before commencing such downhole pumping operations.

SUMMARY

A summary of certain embodiments described herein is set forth below. It should be understood that these aspects are presented merely to provide the reader with a brief summary of these certain embodiments and that these aspects are not intended to limit the scope of this disclosure.

The systems and methods presented herein include a renovated workflow as part of a fracturing pump control and automation user interface, which provides a streamlined user experience for pump operators. The user interface provides relatively simple and intuitive workflow for the operators to setup the pump operation, prepare the pumping job with automated prime up and pressure test, and perform the pumping operations. In addition, the user interface minimizes human intervention, reduces the need for training, and reduces the risk of human errors. In addition, through closer human-machine interaction, the user interface allows for quicker response in both operation and maintenance. The intuitive workflows simplify the operation, maximize the asset optimization, result in extended equipment life, and render consistent high-quality end service.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which:

FIGS. 3-12 illustrate various graphical user interfaces that may be presented via a display of the various devices described herein, in accordance with embodiments of the present disclosure.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "uphole" and "downhole", "upper" and "lower," "top" and "bottom," and other like terms indicating relative positions to a given point or element are utilized to more clearly describe some elements. Commonly, these terms relate to a reference point as the surface from which drilling operations are initiated as being the top (e.g., uphole or upper) point and the total depth along the drilling axis being the lowest (e.g., downhole or lower) point, whether the well (e.g., wellbore, borehole) is vertical, horizontal or slanted relative to the surface.

Figure 1:
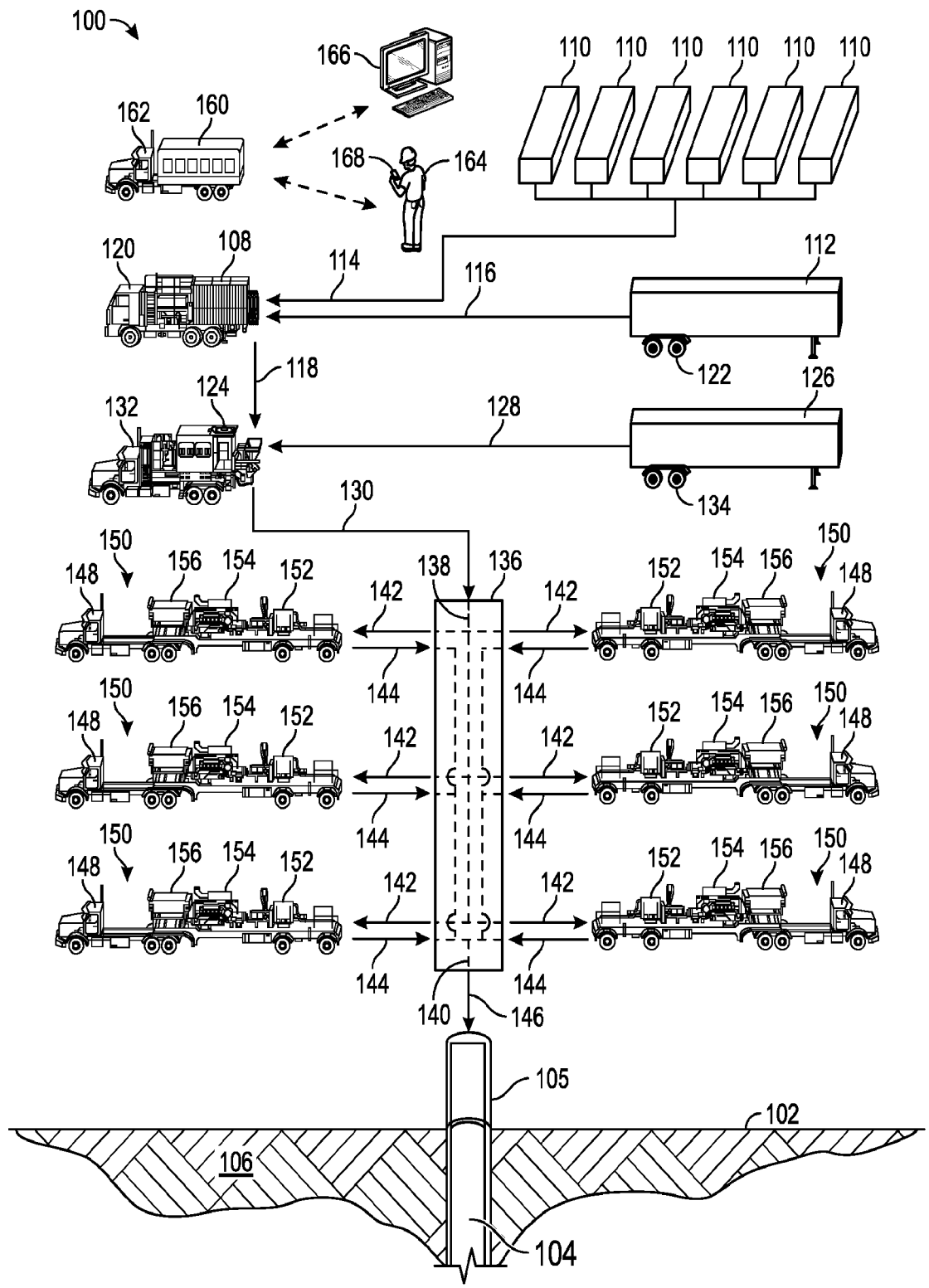
FIG. 1 is a schematic view of at least a portion of a wellsite system, in accordance with embodiments of the present disclosure.

FIG. 1 is a schematic view of at least a portion of a wellsite system 100 that may utilize the embodiments described herein. In particular, FIG. 1 illustrates a wellsite 102, a wellbore 104 extending from the terrain surface of the wellsite 102, a partial sectional view of a subterranean formation 106 penetrated by the wellbore 104, and a wellhead 105, as well as various pieces of equipment or components located at the wellsite 102. In certain embodiments, the wellsite system 100 may be operable to transfer various materials and additives from corresponding sources to a destination location for blending or mixing and eventual injection into the wellbore 104 during a fracturing operations.

In certain embodiments, the wellsite system 100 may include a mixing unit 108 (referred to hereinafter as a "first mixer") fluidly connected with one or more tanks 110 and a first container 112. In certain embodiments, the first container 112 may contain a first material and the tanks 110 may contain a liquid. In certain embodiments, the first material may be or comprise a hydratable material or gelling agent, such as guar, polymers, synthetic polymers, galactomannan, polysaccharides, cellulose, and/or clay, among other examples, whereas the liquid may be or comprise an aqueous fluid, such as water or an aqueous solution comprising water, among other examples. In certain embodiments, the first mixer 108 may be operable to receive the first material and the liquid, via two or more conduits or other material transfer means (hereafter simply "conduits") 114, 116, and mix or otherwise combine the first material and the liquid to form a base fluid, which may be or comprise what is referred to as a gel. In certain embodiments, the first mixer 108 may then discharge the base fluid via one or more fluid conduits 118.

In certain embodiments, the wellsite system 100 may also include a second mixer 124 fluidly connected with the first mixer 108 and a second container 126. In certain embodiments, the second container 126 may contain a second material that may be substantially different than the first material. For example, in certain embodiments, the second material may be or comprise a proppant material, such as sand, sand-like particles, silica, quartz, and/or propping agents, among other examples. In certain embodiments, the second mixer 124 may be operable to receive the base fluid from the first mixer 108 via the one or more fluid conduits 118, and the second material from the second container 126 via one or more fluid conduits 128, and mix or otherwise combine the base fluid and the second material to form a mixture, which may be or comprise what is referred to as a fracturing fluid. In certain embodiments, the second mixer 124 may then discharge the mixture via one or more fluid conduits 130.

In certain embodiments, the mixture may be distributed from the second mixer 124 to a common manifold 136 via the one or more fluid conduits 130. In certain embodiments, the common manifold 136 may include various valves and diverters, as well as a suction line 138 and a discharge line 140, such as may be collectively operable to direct the flow of the mixture from the second mixer 124 in a selected or predetermined manner. In certain embodiments, the common manifold 136 may distribute the mixture to a fleet of pump units 150. Although the fleet is illustrated in FIG. 1 as including six pump units 150, the fleet may instead include other quantities of pump units 150 within the scope of the present disclosure.

In certain embodiments, each pump unit 150 may include at least one pump 152, at least one prime mover 154, and perhaps at least one heat exchanger 156. In certain embodiments, each pump unit 150 may receive the mixture from the suction line 138 of the common manifold 136, via one or more fluid conduits 142, and discharge the mixture under pressure to the discharge line 140 of the common manifold 136, via one or more fluid conduits 144. In certain embodiments, the mixture may then be discharged from the common manifold 136 into the wellbore 104 via one or more fluid conduits 146, the wellhead 105, and perhaps various additional valves, conduits, and/or other hydraulic circuitry fluidly connected between the common manifold 136 and the wellbore 104.

In certain embodiments, the wellsite system 100 may also include a control center 160, which may be or comprise a controller, such as may be operable to provide control to one or more portions of the wellsite system 100 and/or may be operable to monitor health and functionality of one or more portions of the wellsite system 100. For example, in certain embodiments, the control center 160 may be operable to monitor and control one or more portions of the mixers 108, 124, the pump units 150, the common manifold 136, and various other pumps, conveyers, and/or other wellsite equipment (not shown) disposed along the conduits 114, 116, 118, 128, 130, such as may be operable to move, mix, separate, or measure the fluids, materials, and/or mixtures described above and inject such fluids, materials, and/or mixtures into the wellbore 104. Communication between the control center 160 and the various portions of the wellsite system 100 may be via wired and/or wireless communication means. However, for clarity and ease of understanding, such communication means are not depicted in FIG. 1, and a person having ordinary skill in the art will appreciate that such communication means are within the scope of the present disclosure.

As illustrated in FIG. 1, in certain embodiments, one or more of the containers 112, 126, the mixers 108, 124, the pump units 150, and the control center 160 may each be disposed on corresponding trucks, trailers, and/or other mobile carriers 122, 134, 120, 132, 148, 162, respectively, such as may permit their transportation to the wellsite surface 102. However, one or more of the containers 112, 126, the mixers 108, 124, the pump units 150, and the control center 160 may each be skidded or otherwise stationary, and/or may be temporarily or permanently installed at the wellsite 102.

In certain embodiments, a field engineer, equipment operator, or field operator 164 (collectively referred to hereinafter as a "wellsite operator") may operate one or more components, portions, or systems of the wellsite equipment and/or perform maintenance or repair on the wellsite equipment. For example, in certain embodiments, the wellsite operator 164 may assemble the wellsite system 100, operate the wellsite equipment to perform the fracturing operations, check equipment operating parameters, and repair or replace malfunctioning or inoperable wellsite equipment, among other operational, maintenance, and repair tasks, collectively referred to hereinafter as wellsite operations. In certain embodiments, the wellsite operator 164 may perform wellsite operations by himself or with other wellsite operators. In certain embodiments, during wellsite operations, the wellsite operator 164 may communicate instructions to the other operators via a human machine interface (HMI) 166 and/or a communication device 168. In certain embodiments, the wellsite operator 164 may also communicate control signals or other information to the control center 160 via the HMI 166 or the communication device 168 during and/or before the wellsite operations. In certain embodiments, the wellsite operator 164 may also control one or more components, portions, or systems of the wellsite system 100 from the control center 160 or via the HMI 166 or the communication device 168.

Although FIG. 1 illustrates the wellsite system 100 as being operable to transfer additives and produce mixtures that may be pressurized and injected into the wellbore 104 during hydraulic fracturing operations, in other embodiments, the wellsite system 100 may instead be operable to transfer other additives and produce other mixtures that may be pressurized and injected into the wellbore 104 during other oilfield operations, such as cementing, acidizing, chemical injecting, and/or water jet cutting operations, among other examples. Accordingly, unless described otherwise, the one or more fluids being pumped by the pump units 150 may be referred to hereinafter simply as "a fluid."

Figure 2:
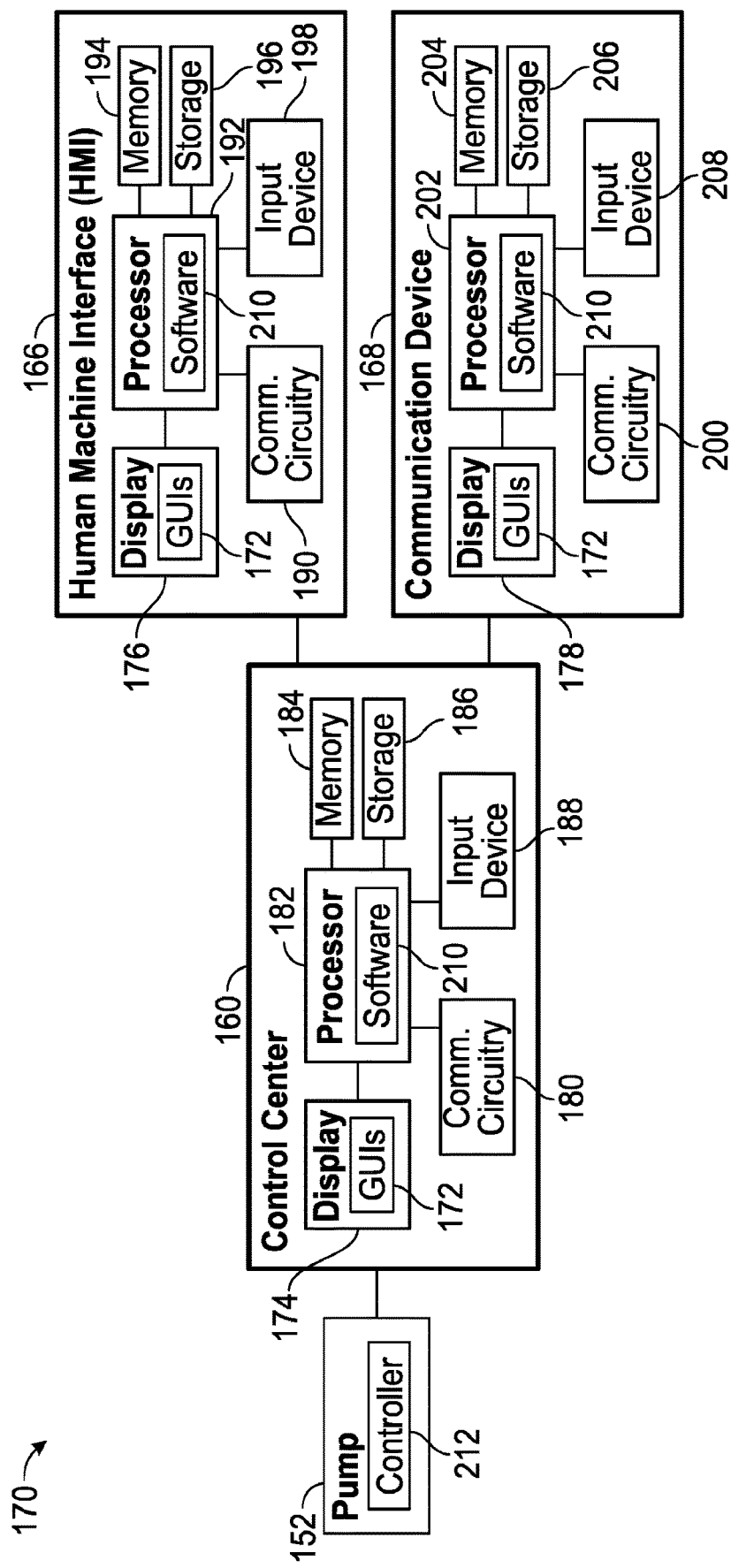
FIG. 2 is a block diagram of a computing system configured to provide a graphical user interface for interacting with pumps of the pump units of the wellsite system of FIG. 1, in accordance with embodiments of the present disclosure.

FIG. 2 is a block diagram of an embodiment of a computing system 170 configured to provide a graphical user interface 172 for interacting with pumps 152 of the pump units 150 of the wellsite system 100 of FIG. 1. For example, in certain embodiments, the computing system 170 may include the control center 160 (or some other control system), which may be configured to provide the graphical user interface 172 to a display 174 of the control center 160 itself, a display 176 of one or more HMIs 166, a display 178 of one or more communication devices 168, or some combination thereof, to facilitate interaction of a wellsite operator 164 with one or more pumps 152 of the pump units 150 of the wellsite system 100 of FIG. 1.

The control center 160, in certain embodiments, may be include one or more computers that may be connected through a real-time communication network, such as the Internet. In certain embodiments, analysis or processing operations may be distributed over the computers that make up the control center 160. In certain embodiments, the control center 160 may receive information from various sources, such as via inputs received from HMIs 166, from the communication devices 168, or from other computing devices. As described in greater detail herein, the control center 160 may generate graphical user interfaces 172 that are displayed via the displays 174, 176, 178, and which facilitate interaction with the pumps 152, for example, based on user inputs received via the graphical user interfaces 172.

The control center 160 may include certain components to facilitate these actions. As illustrated, in certain embodiments, the control center 160 may include communication circuitry 180, at least one processor 182, at least one memory medium 184, at least one storage medium 186, at least one input device 188, the display 174, and any of a variety of other components that enable the control center 160 to carry out the techniques described herein. The communication circuitry 180 may include wireless or wired communication circuitry, which may facilitate communication with the pumps 152, the HMIs 166, the communication devices 168, and other devices or systems.

The at least one processor 182 may be any suitable type of computer processor or microprocessor capable of executing computer-executable code. The at least one processor 182 may also include multiple processors that may perform the operations described herein. The at least one memory medium 184 and the at least one storage medium 186 may be any suitable articles of manufacture that can serve as media to store processor-executable code, data, or the like. These articles of manufacture may represent computer-readable media (e.g., any suitable form of memory or storage) that may store the processor-executable code used by the at least one processor 182 to perform the presently disclosed techniques. The at least one memory medium 184 and/or the at least one storage medium 186 may also be used to store the data, various other software applications, and the like. The at least one memory medium 184 and the at least one storage medium 186 may represent non-transitory computer-readable media (e.g., any suitable form of memory or storage) that may store the processor-executable code used by the at least one processor 182 to perform various techniques described herein. It should be noted that non-transitory merely indicates that the media is tangible and not a signal.

As described in greater detail herein, in certain embodiments, the at least one processor 182 of the control center 160 may communicate with the pumps 152, the HMIs 166, the communication devices 168, and other devices or systems, to facilitate the techniques described herein. Specifically, in certain embodiments, the at least one processor 182 of the control center 160 may execute the processor-executable code stored in the at least one memory medium 184 and/or the at least one storage medium 186 of the control center 160 to provide the graphical user interfaces 172 for the purpose of facilitating interaction with the pumps 152.

In addition, in certain embodiments, the at least one processor 182 of the control center 160 may execute processor-executable code stored in the at least one memory medium 184 and/or the at least one storage medium 186 of the control center 160 to cause the graphical user interfaces 172 to be displayed via the display 174 of the control center 160, as described in greater detail herein. In addition, in certain embodiments, the at least one input device 188 of the control center 160 may be configured to receive input commands (e.g., from a wellsite operator 164), which may be used by the control center 160 to determine interactions with the pumps 152, as well as determine adjustments to the graphical user interfaces 172. In certain embodiments, the at least one input device 188 may include a mouse, touchpad, touchscreen, keyboard and so forth.

It should also be noted that the components described above with regard to the control center 160 are exemplary components, and the control center 160 may include additional or fewer components in certain embodiments. Additionally, it should be noted that the HMIs 166 and the communication devices 168 may also include similar components as described as part of the control center 160 (e.g., respective communication devices, processors, memory media, storage media, displays, and input devices) to facilitate the disclosed operation of the computing system 170.

For example, as illustrated in FIG. 2, in certain embodiments, the HMIs 166 may include communication circuitry 190, at least one processor 192, at least one memory medium 194, at least one storage medium 196, at least one input device 198, and the display 176 described herein. The communication circuitry 190 may include wireless or wired communication circuitry, which may facilitate communication with the communication circuitry 180 of the control center 160, for example.

The at least one processor 192 may be any suitable type of computer processor or microprocessor capable of executing computer-executable code. The at least one processor 192 may also include multiple processors, in certain embodiments. The at least one memory medium 194 and the at least one storage medium 196 may be any suitable articles of manufacture that can serve as media to store processor-executable code, data, or the like. These articles of manufacture may represent computer-readable media (e.g., any suitable form of memory or storage) that may store the processor-executable code used by the at least one processor 192. The at least one memory medium 194 and/or the at least one storage medium 196 may also be used to store the data, various other software applications, and the like. The at least one memory medium 194 and the at least one storage medium 196 may represent non-transitory computer-readable media (e.g., any suitable form of memory or storage) that may store the processor-executable code used by the at least one processor 192 to perform various techniques described herein.

In certain embodiments, the HMIs 166 may receive signals relating to the graphical user interfaces 172 from the control center 160, for example, via communication of the communication circuitry 180, 190 of the control center 160 and the HMIs 166, respectively. The at least one processor 192 of the HMIs 166 may execute processor-executable code stored in the at least one memory medium 194 and/or the at least one storage medium 196 of the HMIs 166 to cause the graphical user interfaces 172 to be displayed via the display 176 of the HMIs 166 in accordance with the signals received from the control center 160, as described in greater detail herein.

In addition, in certain embodiments, the at least one input device 198 of the HMIs 166 may be configured to receive input commands (e.g., from a wellsite operator 164), which may be used by the control center 160 to determine interactions with the pumps 152, as well as determine adjustments to the graphical user interfaces 172. In certain embodiments, the at least one input device 198 may include a mouse, touchpad, touchscreen, keyboard and so forth.

Similarly, as also illustrated in FIG. 2, in certain embodiments, the communication devices 168 may also include communication circuitry 200, at least one processor 202, at least one memory medium 204, at least one storage medium 206, at least one input device 208, and the display 178 described herein. In certain embodiments, the communication devices 168 may be dedicated client devices, laptops, tablet computers, cellular telephones, and so forth. The communication circuitry 200 may include wireless or wired communication circuitry, which may facilitate communication with the communication circuitry 180 of the control center 160, for example.

The at least one processor 202 may be any suitable type of computer processor or microprocessor capable of executing computer-executable code. The at least one processor 202 may also include multiple processors, in certain embodiments. The at least one memory medium 204 and the at least one storage medium 206 may be any suitable articles of manufacture that can serve as media to store processor-executable code, data, or the like. These articles of manufacture may represent computer-readable media (e.g., any suitable form of memory or storage) that may store the processor-executable code used by the at least one processor 202. The at least one memory medium 204 and/or the at least one storage medium 206 may also be used to store the data, various other software applications, and the like. The at least one memory medium 204 and the at least one storage medium 206 may represent non-transitory computer-readable media (e.g., any suitable form of memory or storage) that may store the processor-executable code used by the at least one processor 202 to perform various techniques described herein.

Similarly, in certain embodiments, the communication devices 168 may also receive signals relating to the graphical user interfaces 172 from the control center 160, for example, via communication of the communication circuitry 180, 200 of the control center 160 and the communication devices 168, respectively. The at least one processor 202 of the communication devices 168 may execute processor-executable code stored in the at least one memory medium 204 and/or the at least one storage medium 206 of the communication devices 168 to cause the graphical user interfaces 172 to be displayed via the display 178 of the communication devices 168 in accordance with the signals received from the control center 160, as described in greater detail herein.

In addition, in certain embodiments, the at least one input device 208 of the communication devices 168 may be configured to receive input commands (e.g., from a wellsite operator 164), which may be used by the control center 160 to determine interactions with the pumps 152, as well as determine adjustments to the graphical user interfaces 172. In certain embodiments, the at least one input device 208 may include a mouse, touchpad, touchscreen, keyboard and so forth.

Specifically, as described in greater detail herein, the graphical user interfaces 172 may be presented as software 210 running on the various devices described herein, wherein the software 210 facilitates orchestrated rate control of high-pressure fracturing pumps 152 of the pump units 150 of the wellsite system 100 of FIG. 1. Specifically, the graphical user interfaces 172 facilitate automatic determination of optimal master rate setpoints for an entire fleet of pump units 150 such that the pumps 152 of the pump units 150 may be operated in an optimized mode, for example, with minimized gear shifts.

Figure 3:
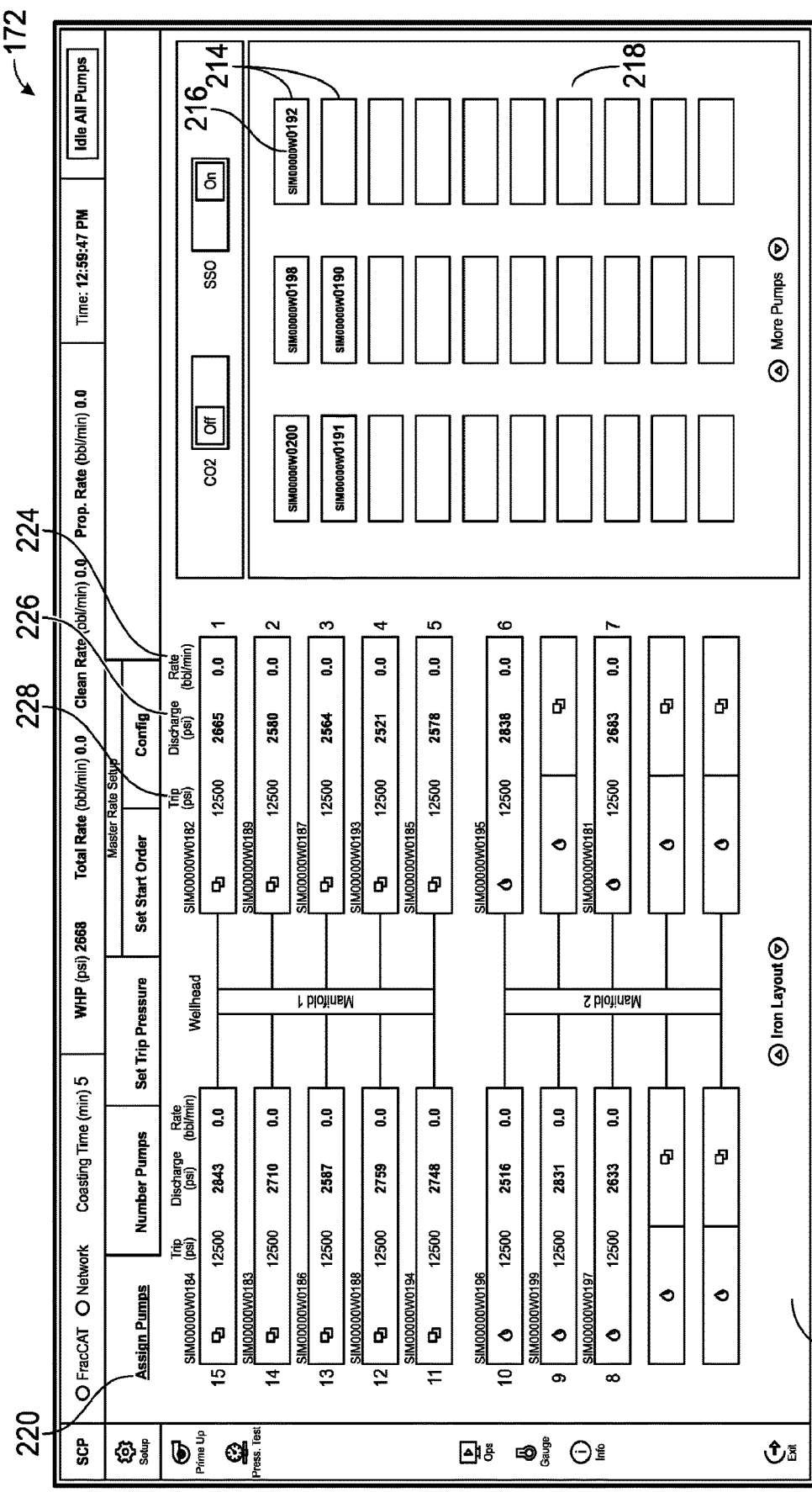

For example, FIGS. 3-12 illustrate various graphical user interfaces 172 that may be presented via a display 174, 176, 178 of the various devices described herein. For example, as illustrated in FIG. 3, in certain embodiments, the software 210 may automatically detect which pumps 152 are currently activated by, for example, detecting the pumps 152 that have a pump controller 212 (see, e.g., FIG. 2) turned on. In certain embodiments, when software 210 of the control center 160 detects that one or more pumps 152 have changed states (e.g., have been activated or deactivated), the software 210 of the control center 160 may send command signals to one or more HMIs 166 and/or communication devices 168 to cause software 210 of the one or more HMIs 166 and/or communication devices 168 to automatically (e.g., without human intervention) launch a graphical user interface 172 on a display 176, 178 of the one or more HMIs 166 and/or communication devices 168.

As illustrated in FIG. 3, in certain embodiments, the detected pumps 152 (i.e., having pump controllers 212 that are tuned on) may appear as icons 214 with their unique asset identifiers (IDs) 216 in a pump list panel 218 on the right side of an "Assign Pumps" screen of the graphical user interface 172, which may be accessed via the graphical user interface 172 by selecting an "Assign Pumps" tab 220. In certain embodiments, a user (e.g., a wellsite operator 164) may click on an icon 214 relating to a specific pump 152 in the pump list panel 218, and drag it to a desired location in a manifold layout panel 222 on the left side of the "Assign Pumps" screen. As illustrated in FIG. 3, in certain embodiments, the manifold layout panel 222 represents an actual physical layout of the pumps 152 (as well as one or more manifolds) to give the wellsite operator 164 an intuitive presentation of all of the pumps 152 and their most important operating parameters. For example, as also illustrated in FIG. 3, when dragged into the manifold layout panel 222, the pumps 152 have their respective flow rates 224 (e.g., in barrels per minute) and discharge pressures 226 (e.g., in pounds per square inch), as well as their trip pressures 228 (e.g., in pounds per square inch), displayed.

Figure 4:
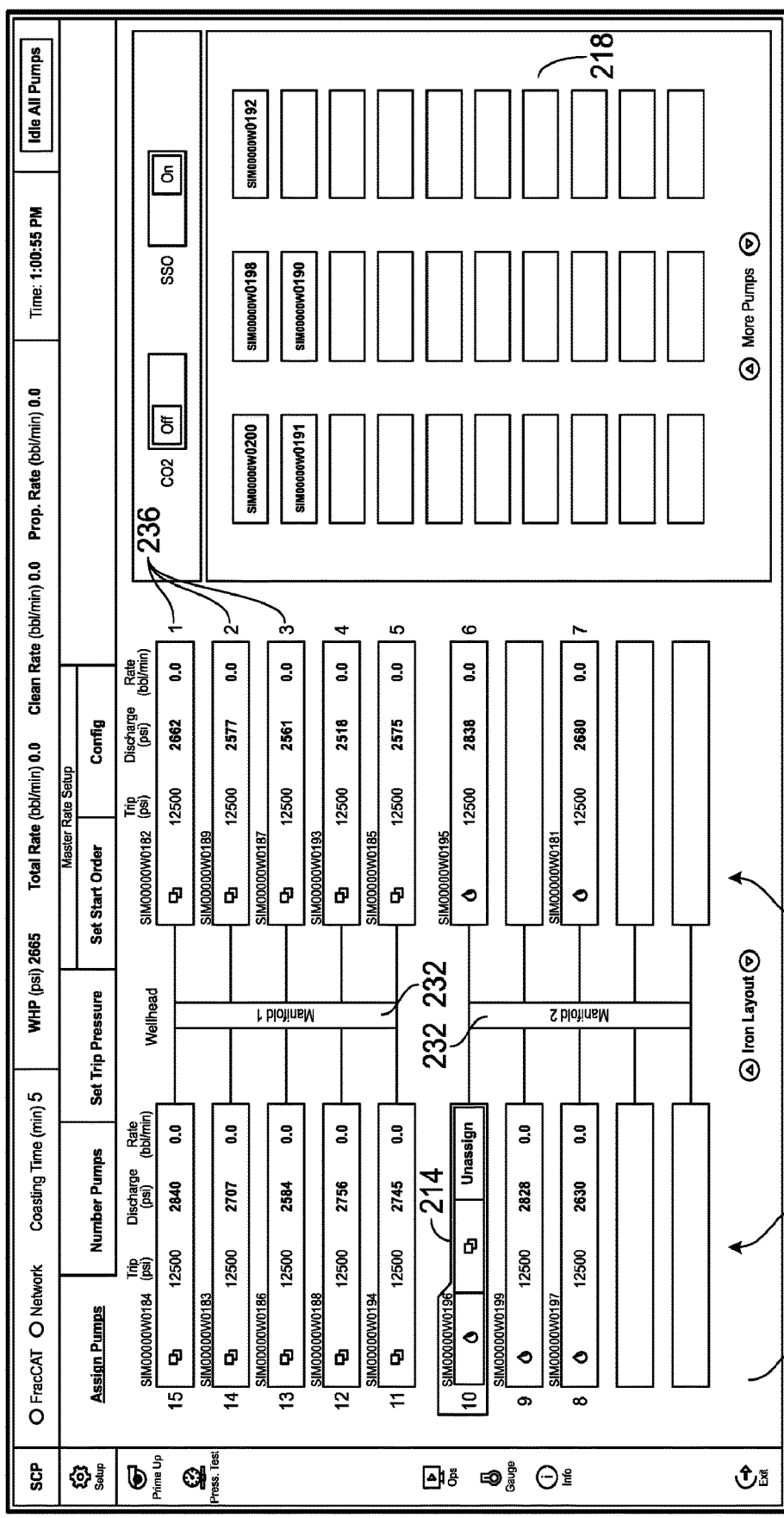

In the event that a mistake is made (e.g., that a pump 152 has been assigned improperly), and a correction needs to be made regarding the assigned pumps 152, the wellsite operator 164 may click on an icon 214 relating to a particular pump 152 in the manifold layout panel 222 to select it. Once selected, as illustrated in FIG. 4, the particular pump 152 may be unassigned by selecting an "Unassign" option that is displayed on the icon 214 for the respective pump 152, or may change an assignment of the particular pump 152 (e.g., by dragging it from a clean side 230 of a particular manifold 232 to a proppant side 234 of a particular manifold 232.

Figure 5:
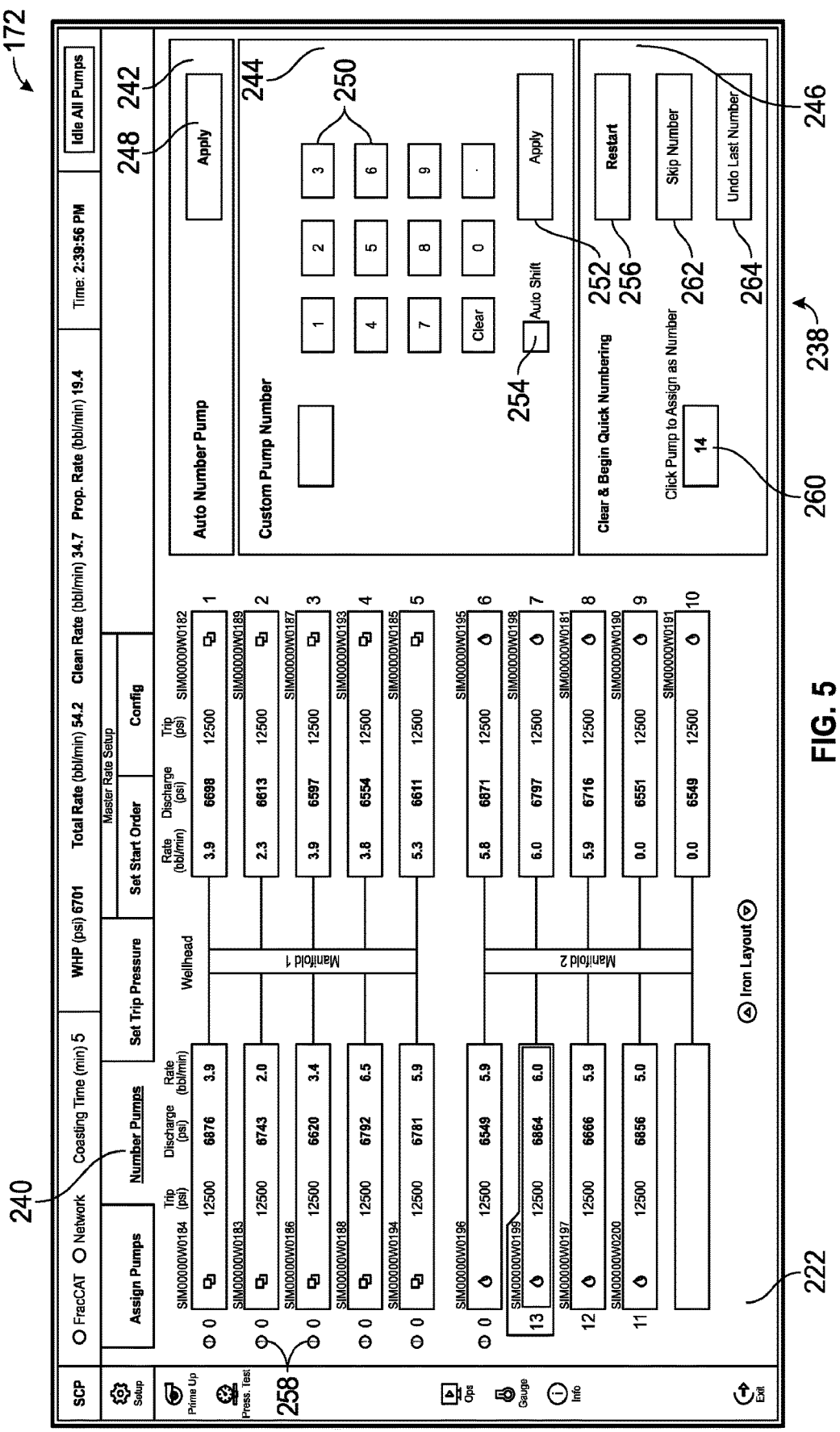

In certain embodiments, pump numbers 236 may be used to quickly refer to various pump 152 on location. In certain embodiments, by default, the software 210 may automatically assign pump numbers 236 incrementally and either in a clockwise manner or in a counterclockwise manner. However, sometimes, a wellsite operator 164 may desire to customize the pump numbering by selecting a pump 152, and then applying a custom pump number 236. In certain embodiments, as illustrated in FIG. 5, various options for renumbering the pumps 152 may be provided via a custom number panel 238 on the right side of a "Number Pumps" screen of the graphical user interface 172, which may be accessed via the graphical user interface 172 by selecting a "Number Pumps" tab 240.

As illustrated, in certain embodiments, these options may include an "Auto Number Pump" option presented via an "Auto Number Pump" sub-panel 242, a "Custom Pump Number" option presented via a "Custom Pump Number" sub-panel 244, and a "Clear & Begin Pump Numbering" option presented via a "Clear & Begin Quick Numbering" sub-panel 246. In general, selecting an "Apply" button 248 in the "Auto Number Pump" sub-panel 242 causes the software 210 to auto number the pumps 152. In addition, entering a custom number via number buttons 250, and selecting an "Apply" button 252 in the "Custom Pump Number" sub-panel 244 causes the software 210 to change the pump number 236 of a selected pump 152 (e.g., pump number 6, in the illustrated example) to the custom number entered. In certain situations, the numbering of the pumps 152 may be auto-shifted (e.g., around the entered customer number) by selecting an "Auto Shift" button 254 in the "Custom Pump Number" sub-panel 244.

In addition, quick numbering of the pumps 152 may be implemented by selecting a "Restart" button 256 in the "Clear & Begin Quick Numbering" sub-panel 246. At this point, all existing pump numbers 236 may be cleared and replaced with 0 (e.g., in certain embodiments, a visual warning sign 258 may be shown next to it before a valid pump number is assigned). During this process, pump numbers may be displayed sequentially in a number box 260 and, for each pump number, the wellsite operator 164 may select a pump 152 from the manifold layout panel 222 to assign the pump number, as desired. In some instances, certain pump numbers may be skipped by selecting a "Skip Number" button 262. In addition, in some instances, the assignment of the last assigned pump number 236 may be undone by selecting an "Undo Last Number" button 264. In certain embodiments, if there are duplicate assigned pump numbers 236, or invalid (e.g., 0) pump numbers, the software 210 may mark those pumps 152 with a visual warning sign 258 next to them, and disallow leaving the "Number Pumps" screen of the graphical user interface 172 until the problem is resolved.

Figure 6:
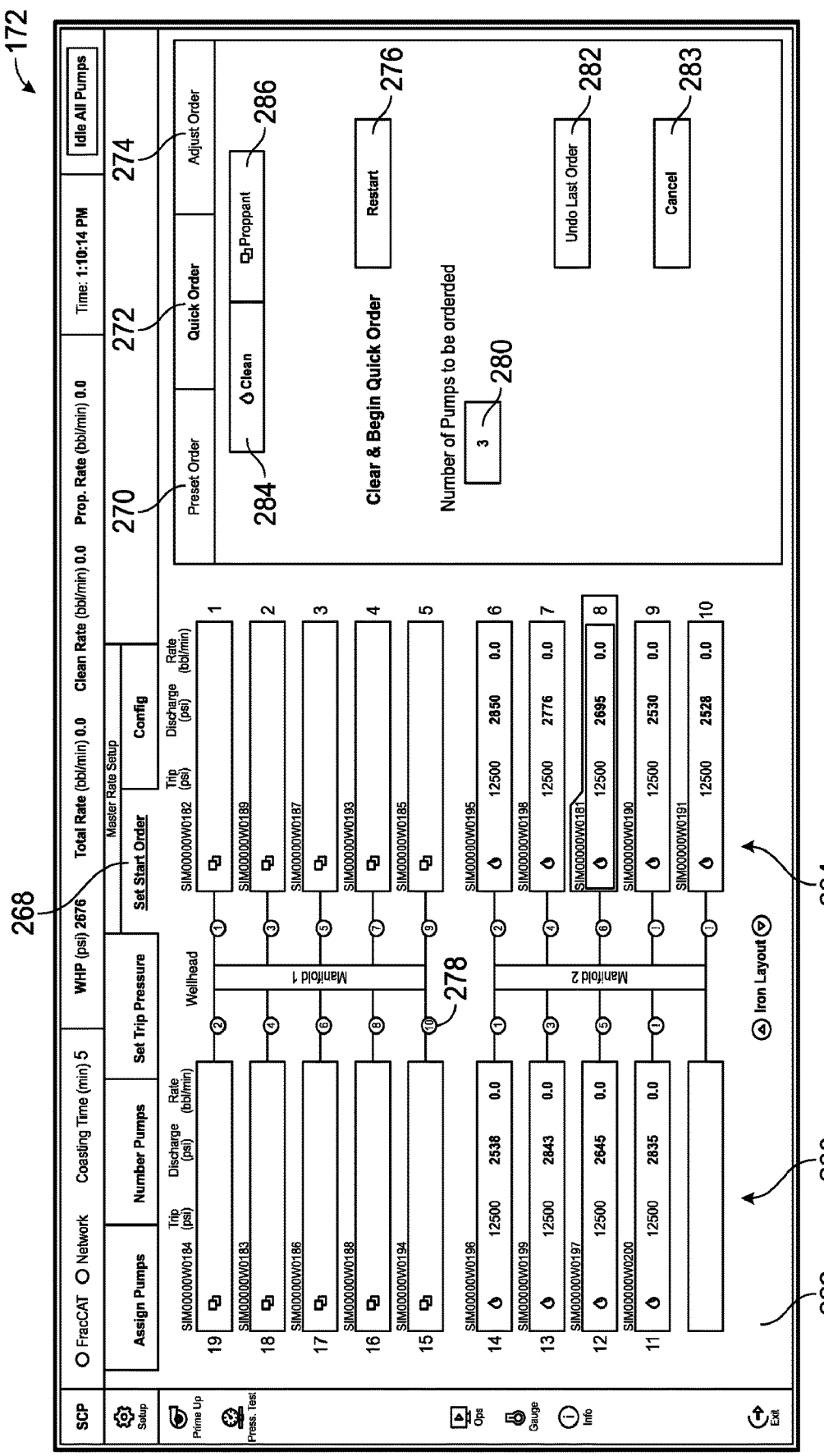
Figure 7:
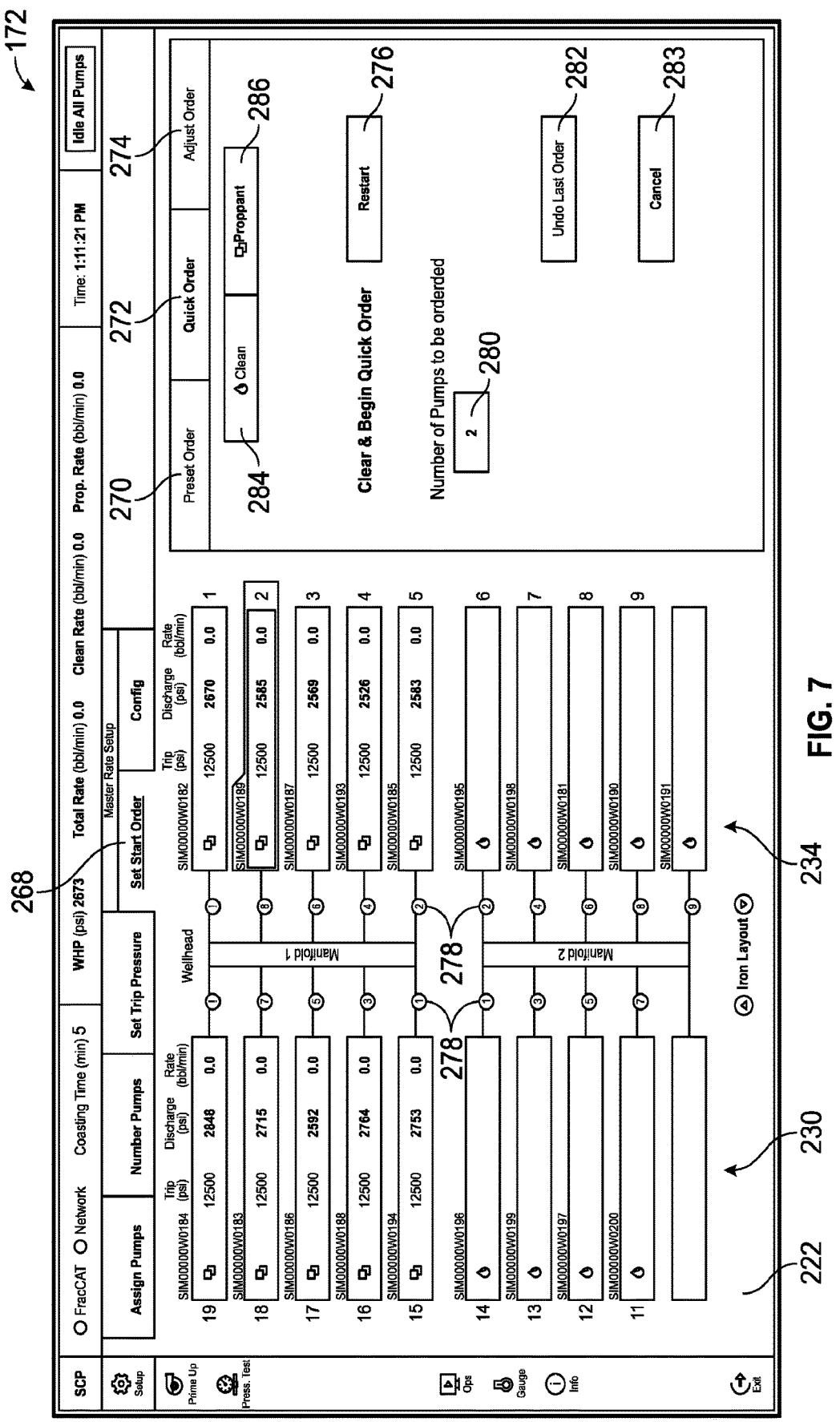

In certain embodiments, the order that each of the pumps 152 are started may be set by the wellsite operator 164. For example, as illustrated in FIG. 6, various options for setting the pump start order may be provided via a start order panel 266 on the right side of a "Set Start Order" screen of the graphical user interface 172, which may be accessed via the graphical user interface 172 by selecting a "Set Start Order" tab 268. As illustrated, in certain embodiments, these options may include a "Preset Order" option, which may be accessed by selecting a "Preset Order" tab 270 of the start order panel 266, a "Quick Order" option, which may be accessed by selecting a "Quick Order" tab 272 of the start order panel 266, and an "Adjust Order" option, which may be accessed by selecting an "Adjust Order" tab 274 of the start order panel 266. In general, the "Preset Order" option selects a default (e.g., preset) order for starting of the pumps 152, and the "Adjust Order" option may present the wellsite operator 164 with options to manually adjust the start order.

Similarly, the "Quick Order" option illustrated in FIG. 6 functions similarly to the quick numbering option described with reference to FIG. 5. For example, the quick order option for setting the order that the pumps 152 are started may be implemented by selecting a "Restart" button 276. At this point, all existing start order numbers 278 for the pumps 152 may be cleared and replaced with 0 (e.g., in certain embodiments, a visual warning sign 258 may be shown before a valid start order number is assigned). During this process, start order numbers may be displayed sequentially in a number box 280 and, for each start order number, the wellsite operator 164 may select a pump 152 from the manifold layout panel 222 to assign the start order number, as desired. In some instances, the assignment of the last assigned start order number 278 may be undone by selecting an "Undo Last Order" button 282. In addition, in some certain embodiments, the quick order function by selecting a "Cancel" button 283. In addition, in certain embodiments, the start order numbers 278 for pumps 152 on the clean side 230 may be set together (see, e.g., FIG. 6), while the start order numbers 278 for pumps 152 on the proppant side 234 may also be set together (see, e.g., FIG. 7). The setting of the start order for the clean side 230 and the proppant side 234 may be selected via a Clean tab 284 and a Proppant tab 286, respectively.

Figure 8:
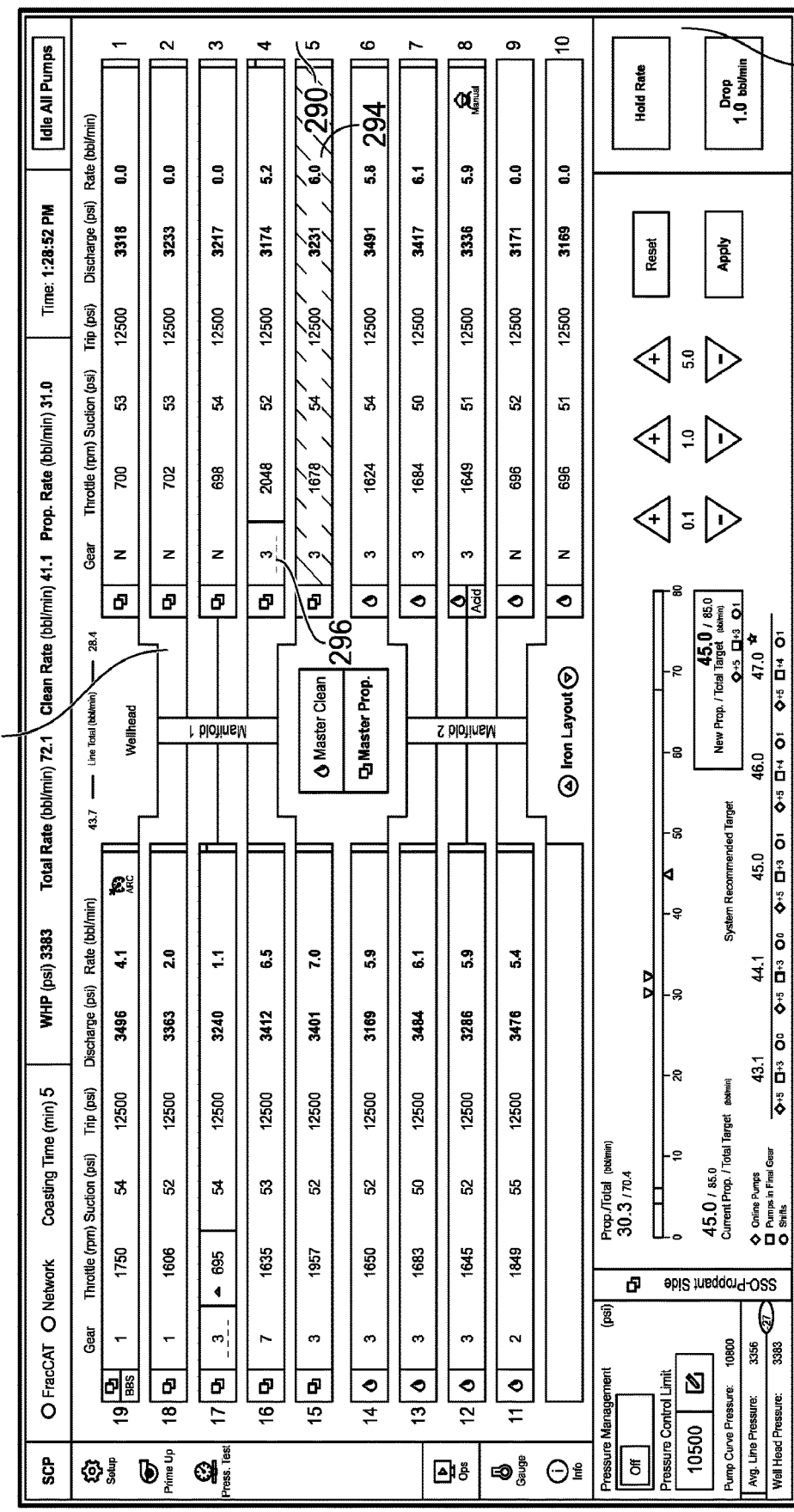

FIG. 8 illustrates a pump operations screen of the graphical user interface 172. This is the view where master pump rate setpoint is specified, for example, in a master pump rate setpoint panel 288 at the bottom of the screen, and pump transitions (e.g., changes) are indicated in a pump transitions view panel 290 in the middle of the screen. In general, the master pump rate setpoint panel 288 facilitates adjusting the master pump rate setpoint by various intervals (e.g., +/−0.1 bbl/min, +/−1.0 bbl/min, +/−5.0 bbl/min, for example), as well as resetting the master pump rate setpoint, holding at a particular master pump rate, and dropping the discharge rate.

Similarly to the setup screen illustrated in FIGS. 3 through 7, in the pump operations view, the manifold outline 292 also represents the actual physical layout of the pumps 152 (as well as one or more manifolds) outside the control cabin to give the wellsite operator 164 an intuitive presentation of all of the pumps 152 and their most important operating parameters. Indeed, in certain embodiments, all of the operating parameters of the individual pumps 152 are vertically aligned in the pump transitions view panel 290 to give the wellsite operator 164 a quick glimpse of the whole picture of how all the pumps 152 are performing, for example, including operating parameters such as flow rate, discharge pressure, trip pressure, suction pressure, gear, clean/proppant side indicator, a fluid type indicator, and so forth. Moreover, in certain embodiments, the most important parameters (e.g., flow rate and discharge pressure) may be presented in bold to draw attention to them. In addition, in certain embodiments, the pumps 152 that are in transition (e.g., currently changing) may be indicated by a dark background 294 in their respective changing parameter's boxes. In certain embodiments, when a pump's gear is out of lockup (in converter mode), a dashed line 296 may be shown below the gear as an indicator.

Figure 9:
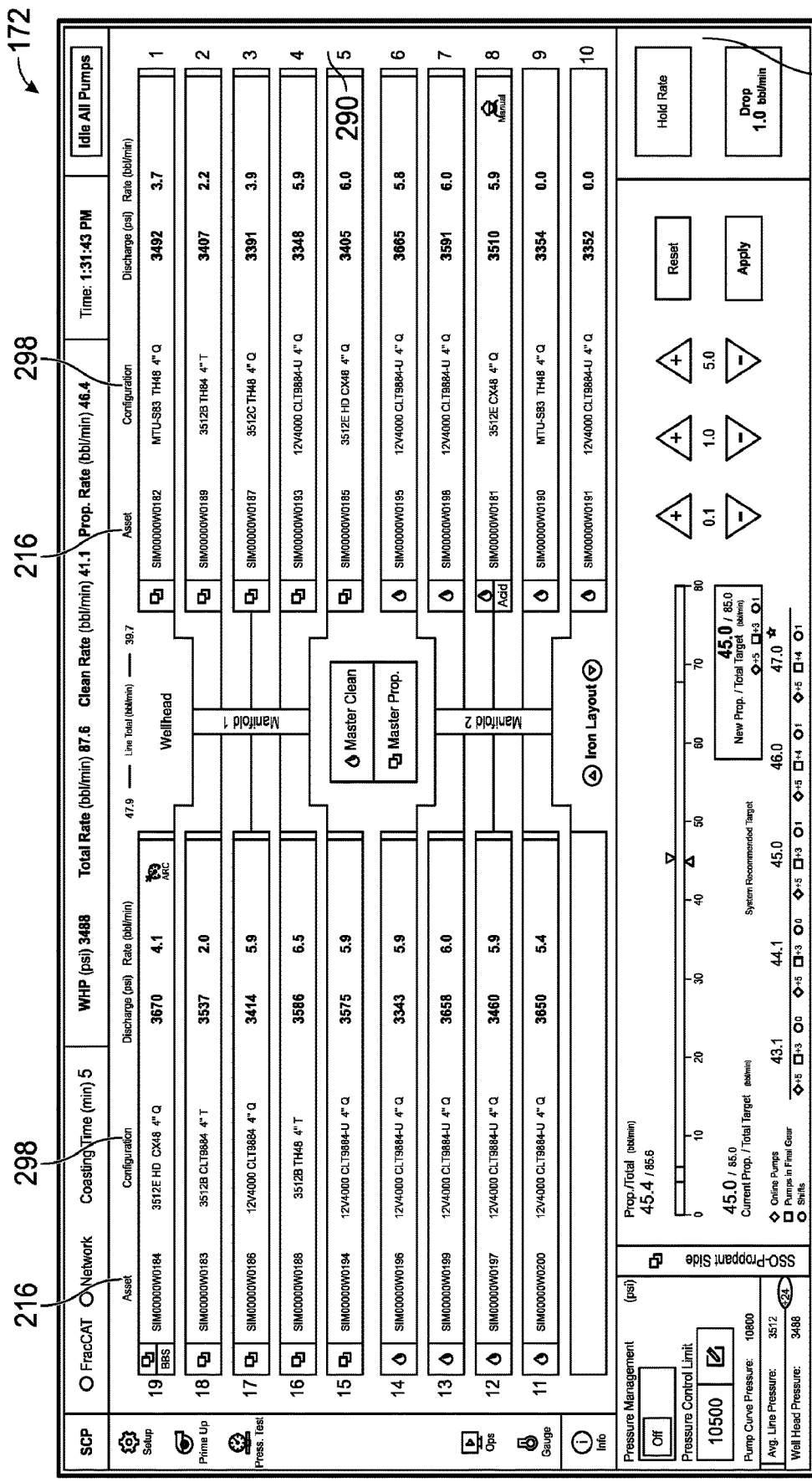

FIG. 9 illustrates an information screen of the graphical user interface 172, which is a snapshot of pump configurations for all of the pumps 152 to give the user a convenient view of pump asset IDs 216 and their configurations 298 (e.g., engine type, transmission type, fluid end size, power end type, and so forth). This information may be particularly useful when pumps 152 are experiencing issues.

Figure 10:
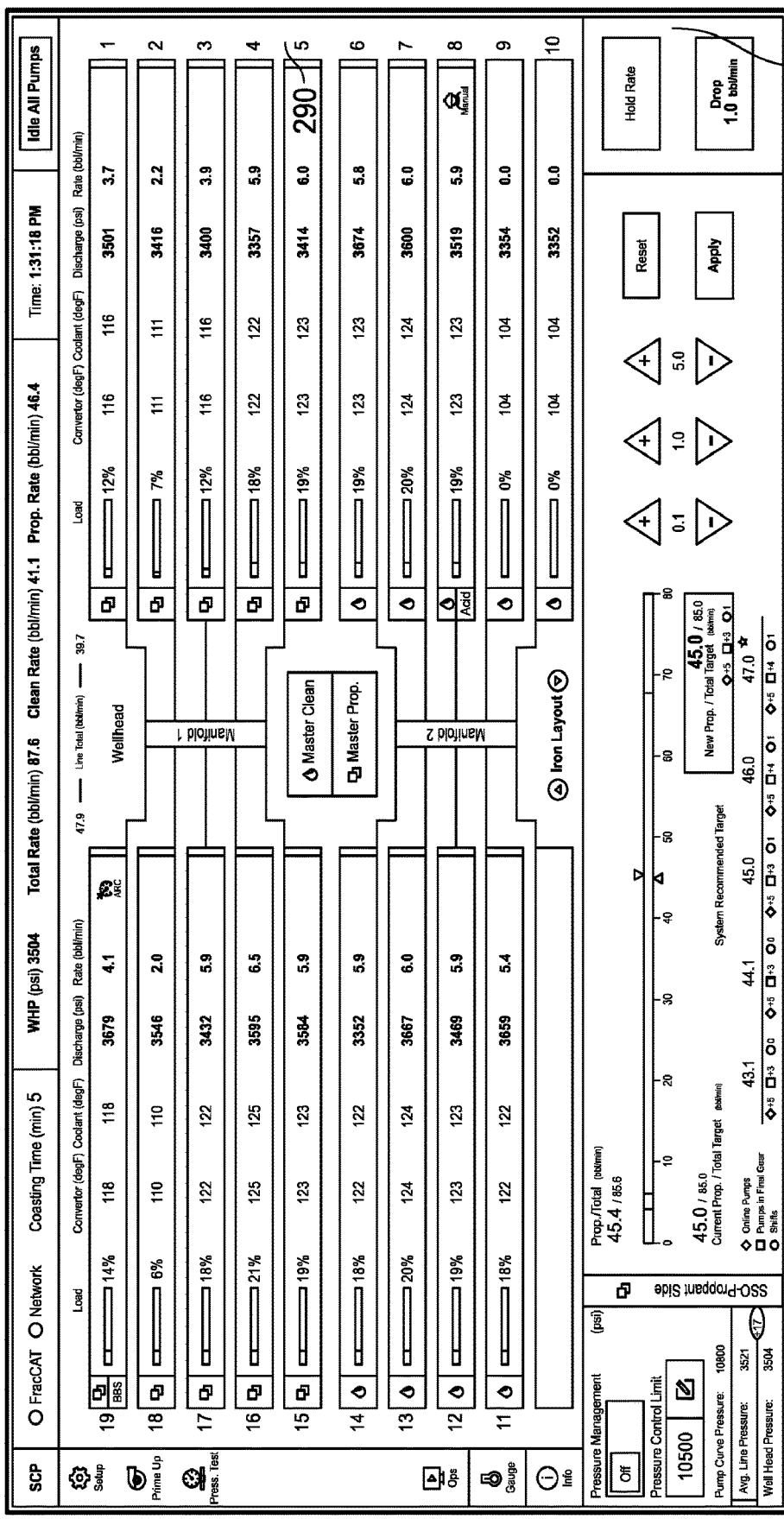

FIG. 10 illustrates a gauge screen of the graphical user interface 172, which is a snapshot of important health information with necessary warnings for all pumps 152 to give the user a convenient view of the important parameters (e.g., engine load, oil converter temperature, coolant temperature, and so forth) for all of the pumps 152. These parameters generally indicate pump health, and if they are exceeding certain thresholds, certain actions on the part of the wellsite operator 164 may be warranted. As illustrated, in certain embodiments, the parameters for each pump 152 may be color coded to indicate various level of warnings (e.g., yellow for regular warnings, and red for shutdown warnings).

Figure 11:
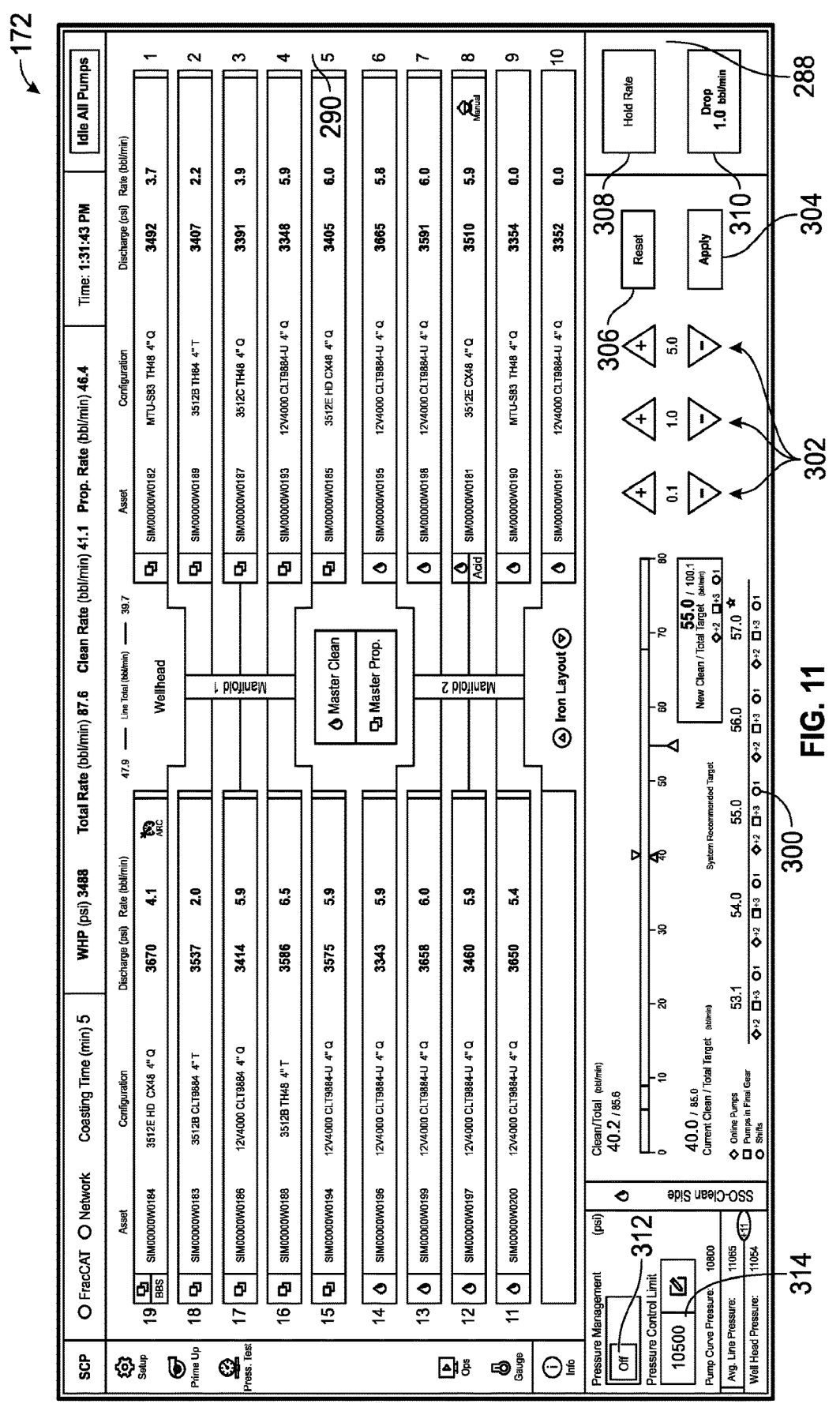

In certain embodiments, to allow the software 210 to optimize the operation as much as possible, for each rate received from the user, the software may return a few suggested recommended target rates 300 near the entered rate setpoint, as illustrated in FIG. 11. In certain embodiments, the suggested target rates 300 may be based on operation optimization, such as fewer gear shifts, more pumps in final gear, and/or more pumps engaged, for example. As illustrated, in certain embodiments, the rates and the optimization indications are shown for the user to make more informed decisions. In addition, in certain embodiments, the user may increase or decrease the master pump rate setpoint by different increments (e.g., +/−0.1 bbl/min, +/−1.0 bbl/min, +/−5.0 bbl/min, and so forth) by interacting with respective master pump rate setpoint adjustment buttons 302 and selecting an "Apply" button 304 in the master pump rate setpoint panel 288. In addition, in certain embodiments, the user may reset the master pump rate setpoint by selecting a "Reset" button 306 in the master pump rate setpoint panel 288. In addition, in certain embodiments, the user may hold the master pump rate setpoint at a particular master pump rate by selecting a "Hold Rate" button 308 in the master pump rate setpoint panel 288. In addition, in certain embodiments, the user may drop the master pump rate setpoint by a preset increment (e.g., 1.0 bbl/min) by selecting a "Drop" button 310 in the master pump rate setpoint panel 288. In addition, in certain embodiments, the user may toggle pressure management on or off by toggling a "Pressure Management" toggle button 312 and setting a particular pressure control limit via a "Pressure Control Limit" text box 314 in the master pump rate setpoint panel 288. Interacting with the control elements of the master pump rate setpoint panel 288 causes the control center 160 to control the pump rates and limit the maximum pressure of the pumps 152. By optimizing the communication between the wellsite operator 164 and the pumps 152, the underlying algorithm may be optimized to its fullest.

Figure 12:
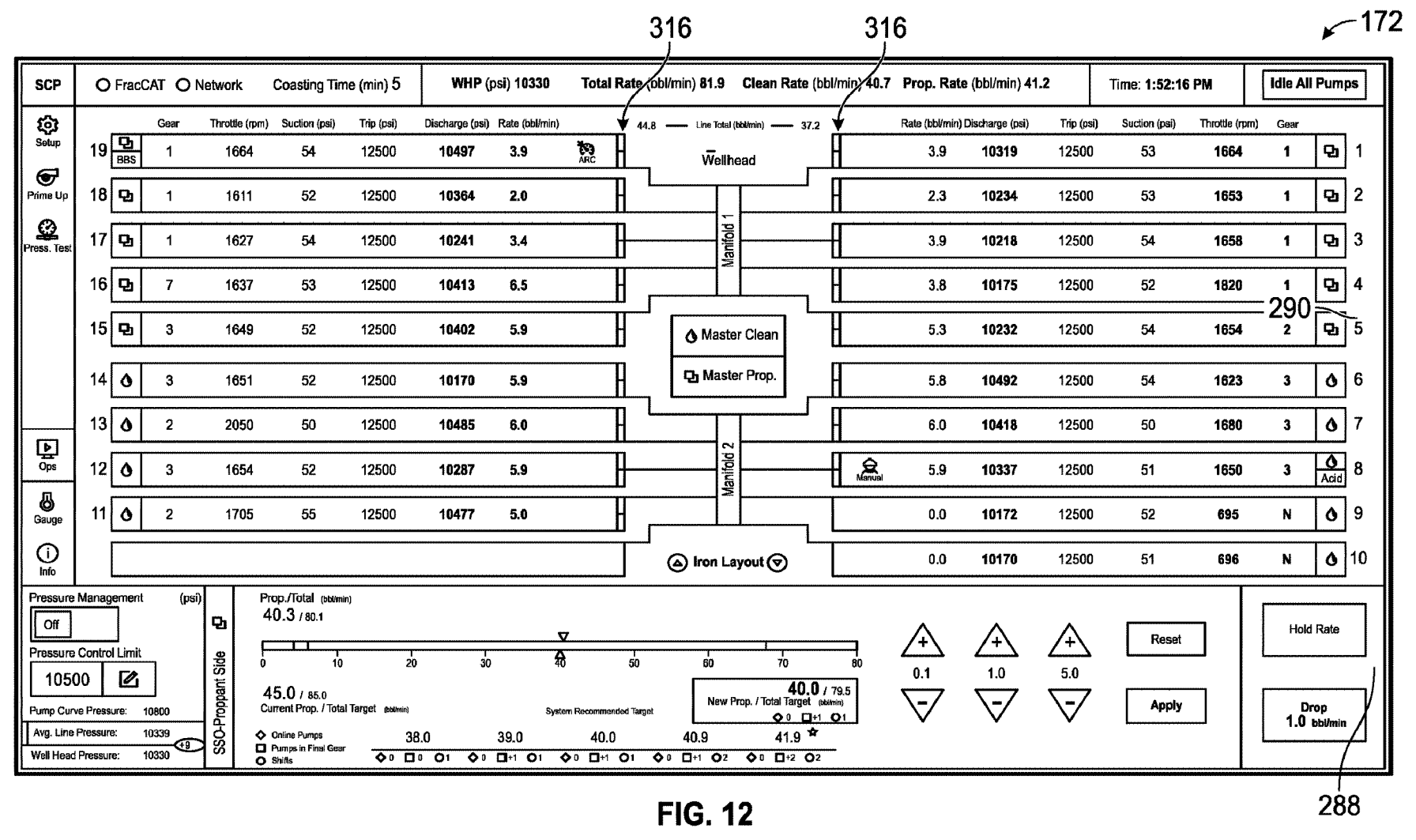

As illustrated in FIG. 12, in certain embodiments, a quick color and progress bar reference 316 for each pump 152 communicates to the user both the steps in automation, as well as overall automation system health of the particular pump 152. This enables both better operator trust in the system, as well as quicker response when human intervention is needed.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A system, comprising:
a non-transitory memory; and
one or more hardware processors configured to read instructions from the non-transitory memory to perform operations comprising:
  detecting one or more pumps of a wellsite system that are activated;
  generating a graphical user interface, wherein the graphical user interface comprises:
    a pump list panel comprising one or more pump icons, each pump icon corresponding to a pump of the one or more pumps; and
    a manifold layout panel comprising a manifold outline that represents an actual physical layout of one or more manifolds of the wellsite system;
  receiving, via the graphical user interface, an input assigning a pump icon of the one or more pump icons onto a pump location of the manifold outline; and
  updating the graphical user interface to display one or more operating parameters of the pump corresponding to the pump icon proximate the pump icon.

2. The system of claim 1, wherein detecting the one or more pumps of the wellsite system that are activated comprises detecting that pump controllers for the one or more pumps are turned on.

3. The system of claim 1, wherein the one or more parameters comprise a flow rate, a discharge pressure, a trip pressure, or a combination thereof.

4. The system of claim 1, wherein each pump icon of the one or more pump icons comprises a unique asset identifier for the pump corresponding to the pump icon.

5. The system of claim 1, wherein each pump icon of the one or more pump icons displays an option to unassign the pump icon from the pump location of the manifold outline.

6. The system of claim 5, wherein the graphical user interface comprises a custom number panel for renumbering the pump icons assigned to pump locations of the manifold outline.

7. The system of claim 6, wherein the custom number panel comprises an auto-numbering sub-panel for applying auto-numbering of the pump icons assigned to pump locations of the manifold outline.

8. The system of claim 6, wherein the custom number panel comprises a custom numbering sub-panel for applying custom numbering of the pump icons assigned to pump locations of the manifold outline.

9. The system of claim 6, wherein the custom number panel comprises a quick numbering sub-panel for applying quick numbering of the pump icons assigned to pump locations of the manifold outline.

10. The system of claim 9, wherein the quick numbering sub-panel comprises a sequentially increasing list of pump numbers that can be assigned to pump icons that are assigned to pump locations of the manifold outline.

11. The system of claim 10, wherein the quick numbering sub-panel comprises an option to skip a pump number of the sequentially increasing list of pump numbers.

12. The system of claim 10, wherein the quick numbering sub-panel comprises an option to undo a last assignment of a pump number.

13. The system of claim 1, wherein the graphical user interface comprises a pump number assigned to each pump icon of the one or more pump icons assigned to a pump location of the manifold outline.

14. The system of claim 1, wherein the graphical user interface comprises a start order number assigned to each pump icon of the one or more pump icons assigned to a pump location of the manifold outline, wherein the start order number assigns an order that the respective pump is started.

15. The system of claim 14, wherein the operations comprise starting the one or more pumps in accordance with start order numbers assigned to the one or more pump icons.

16. The system of claim 14, wherein the graphical user interface comprises a start order panel for assigning start order numbers to the pump icons assigned to pump locations of the manifold outline.

17. The system of claim 16, wherein the start order panel comprises a preset order sub-panel for applying preset ordering of the pump icons assigned to pump locations of the manifold outline.

18. The system of claim 16, wherein the start order panel comprises an adjust order sub-panel for adjusting the start order numbers of the pump icons assigned to pump locations of the manifold outline.

19. The system of claim 16, wherein the start order panel comprises a quick ordering sub-panel for applying quick ordering of the pump icons assigned to pump locations of the manifold outline.

20. The system of claim 19, wherein the quick ordering sub-panel comprises a sequentially increasing list of start order numbers that can be assigned to pump icons that are assigned to pump locations of the manifold outline.

21. The system of claim 20, wherein the quick ordering sub-panel comprises an option to undo a last assignment of a start order number.

22. The system of claim 1, wherein the graphical user interface comprises a master pump rate setpoint panel for setting a master pump rate setpoint.

23. The system of claim 22, wherein the master pump rate setpoint panel comprises recommended target rates near an entered setpoint.

24. The system of claim 1, wherein the graphical user interface comprises a pump operations view comprising a plurality of operating parameters for each pump corresponding to each pump icon assigned to a pump location of the manifold outline.

25. The system of claim 24, wherein each operating parameter of the plurality of operating parameters are vertically aligned.

26. The system of claim 24, wherein the plurality of operating parameters comprises a flow rate, a discharge pressure, a trip pressure, a suction pressure, a gear, a clean/proppant side indicator, a fluid type indicator, or some combination thereof.

27. The system of claim 24, wherein operating parameters that are changing are highlighted in the pump operations view.

28. The system of claim 1, wherein the graphical user interface comprises an information view comprising a plurality of configuration parameters for each pump corresponding to each pump icon assigned to a pump location of the manifold outline.

29. The system of claim 28, wherein the plurality of configuration parameters comprises an asset identification number, an engine type, a transmission type, a fluid end size, a power end type, or some combination thereof.

30. The system of claim 1, wherein the graphical user interface comprises a gauge view comprising a plurality of pump health parameters for each pump corresponding to each pump icon assigned to a pump location of the manifold outline.

31. The system of claim 30, wherein the plurality of pump health parameters comprises an engine load, an oil converter temperature, a converter temperature, or some combination thereof.

32. The system of claim 1, a progress bar for each pump icon assigned to a pump location of the manifold outline.

* * * * *